United States Patent [19]
Rood

[11] 3,814,488
[45] June 4, 1974

[54] BEARING ASSEMBLY

[75] Inventor: William R. Rood, Muskegon, Mich.

[73] Assignee: Keene Corporation, New York, N.Y.

[22] Filed: Mar. 26, 1973

[21] Appl. No.: 344,729

[52] U.S. Cl. .............................................. 308/227
[51] Int. Cl. ............................................ F16c 19/04
[58] Field of Search ........... 308/174, 219, 199, 227, 308/230

[56] References Cited
UNITED STATES PATENTS

| | | |
|---|---|---|
| 2,315,574 | 4/1943 | Anderson............................. 308/174 |
| 3,361,501 | 1/1968 | Messinger et al................... 308/219 |
| 3,370,899 | 2/1968 | Eklund................................ 308/193 |
| 990,946 | 5/1911 | Badger................................ 308/174 |

Primary Examiner—Charles J. Myhre
Assistant Examiner—Frank Susko
Attorney, Agent, or Firm—Johnson, Dienner, Emrich, Verbeck and Wagner

[57] ABSTRACT

Bearing assemblies embodying annular inner and outer bearing races each having at least two grooved bearing paths, in which bearing means having rolling elements of the same diameter in opposed bearing paths of each of the inner and outer races providing for four-point contact with the inner surfaces of the bearing paths, and in which the grooved bearing paths of each race are parallel and concentric within a tolerance of about 0.001 inch per inch of diameter of said rollers.

3 Claims, 7 Drawing Figures

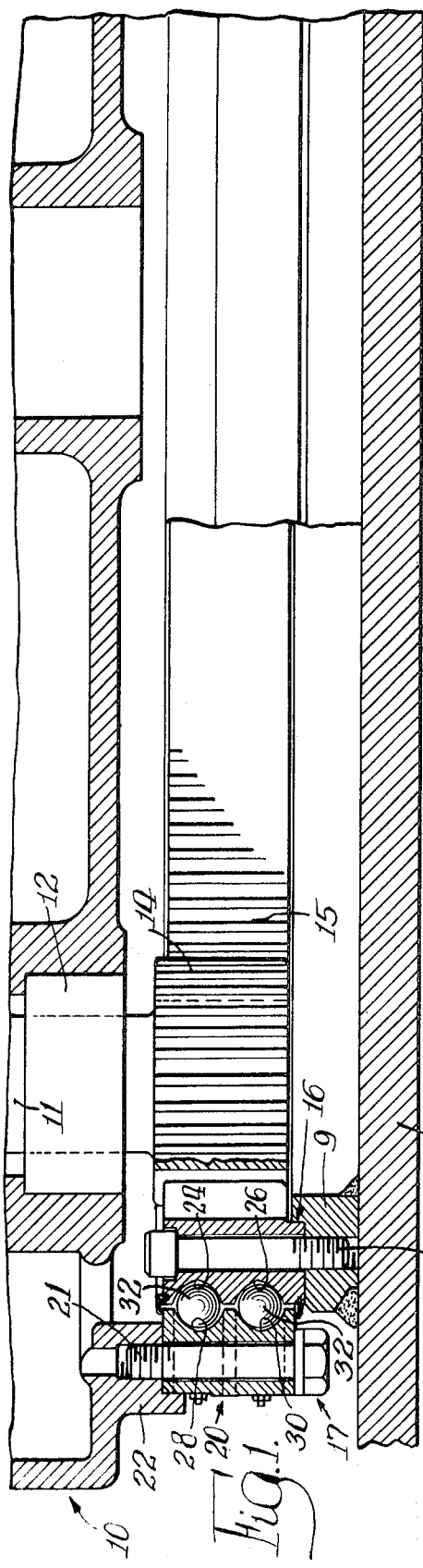
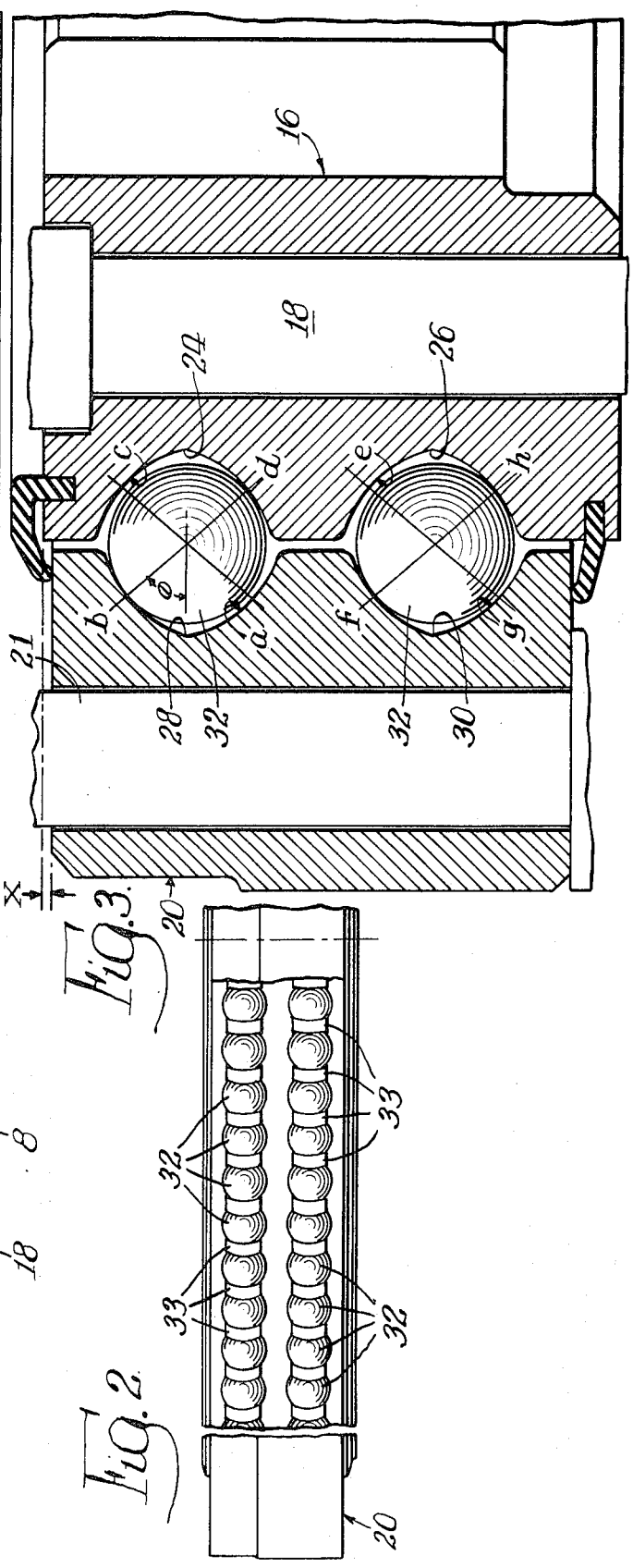

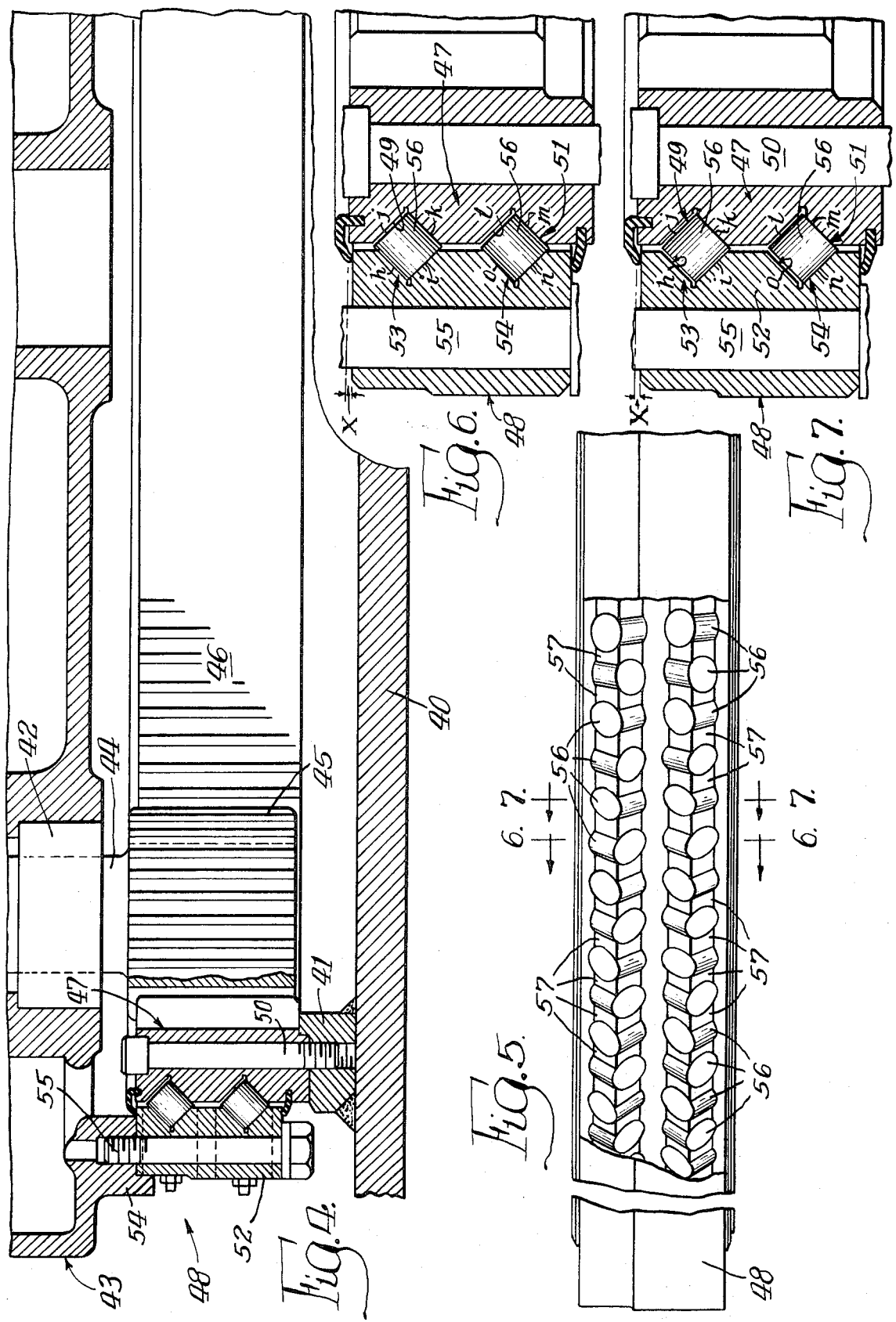

BEARING ASSEMBLY

BACKGROUND OF THE INVENTION

The invention is particularly adapted to turntable bearings for the construction industry. One turntable bearing commonly in use today comprises an outer race, an inner race, and balls or roller separated by spacing elements and features commonly included therein may, for example, comprise mounting holes, gears, seals, dirt protection shields, and lubricating fittings. A typical ball bearing construction of the foregoing type is shown, for example, in U.S. Pat. No. 3,455,616 dated July 15, 1969. A roller bearing type for the purpose noted is typically shown in U.S. Pat. No. 3,275,391 dated Sept. 27, 1966, and U.S. Pat. No. 3,361,501 dated Jan. 2, 1968. It is also known to provide bearings having inner and outer races having two-bearing paths but not with four-point contact bearings.

Recently four-point contact bearings have come into use with a single row of balls located between inner and outer bearing races, and having a single bearing path in each race with the bearing paths being disposed in opposed relation to define a so-called "gothic arch" configuration making possible four-points of contact between a ball and the bearing paths of the races. Additionally, it is known in the art that an arrangement functionally like that of a four-point contact bearing may be achieved by using biangular roller bearings. In the latter instance the inner and outer races are provided with a bearing path defined by a right angle groove in each of the inner and outer races with the openings of the grooves in facing relation and in which rollers are disposed preferably with the axes of circumferentially adjacent rollers at right angles to each other. A detailed description of the function and operation of the four-point contact ball bearing may be found in a catalogue identified as Catalog 300 published by the Keene Corporation, Kaydon Bearing Division of Muskegon, Michigan, copyrighted 1969, and a detailed description of the function and operation of the aforementioned biangular roller bearings may be found in a catalogue identified as Catalog 320 and published by Keene Corporation, Kaydon Bearing Division, and copyrighted 1970.

The two last-noted types of bearings are well suited to sustain radial, thrust and moment loads, in any combination.

THE INVENTION

The present invention concerns itself with a bearing assembly having at least two axially spaced apart grooved bearing paths in annular inner and outer races in which the above referred to balls or rollers define rolling elements which are disposed so as to make four-point contact with the bearing paths. In order to obtain substantially improved benefits for satisfactory heavy load conditions with the bearing assemblies it has been discovered that it is critical that the bearing paths in the inner or outer race be parallel and concentric within an extremely small tolerance of about 0.001 inch per inch of diameter of rolling element; otherwise, the bearing elements will not cooperate and equally divide and share radial, thrust and/or moment loads, and in the absence of the aforementioned critical tolerance the bearing elements will defeat or act against each other.

The aforenoted constructions are advantageous in that they provide greater load-bearing capacity for bearings of similar size. Also the bearing assemblies constructed according to this invention will allow less deflection under a given load than comparable bearings of known type. Further, bearing assemblies constructed according to the invention can be made for less cost than similar bearings of known type for equal load-bearing capacities. The invention provides an economical structure in application requirements of increased capacity which were normally achieved by providing a larger bearing of increased pitch diameter, which is understood in the art to mean the diameter of the locus of the centers of the rolling elements of the bearing, which necessarily involves a considerable increase in cost. With the present invention load-bearing capacity can be similarly increased over that of the known single row bearing of a given pitch diameter with a significantly smaller increase in cost.

Also a known problem of the trade has to do with the behavior and life of the gear teeth and mating pinion gear. The gear and pinion are commonly found after a period of use to have worn unevenly, with more wear having occurred at one end of the teeth. Also, occasionally some teeth of the gear or pinion or both will break, generally only at one end of the teeth. This uneven wear and breakage is commonly recognized as being due to uneven pressure or load across the width of the teeth, being greater at one end. This condition may occur, in spite of the parts having been made and installed correctly, because of the extent to which the turntable bearing deflects under the influence of its loading, inclining the gear with respect to the pinion. Also, the deflection may even move the gear with respect to the pinion axially, so that they are no longer in mesh over their entire tooth lengths. This angular and lateral misalignment can take place when they are transmitting the maximum load, and therefore most susceptible to damage. The present invention, by the interaction and cooperation between the two rows of balls, acts to stiffen the bearing as compared to a single row type, thus effectively reducing the deflection of the bearing under load and thereby correcting or alleviating this problem.

IN THE DRAWINGS

FIG. 1 is a cross-sectional view showing a portion of a rotatably supported structure, such as a turntable, embodying one embodiment of bearing assembly of the invention;

FIG. 2 is a longitudinally developed view of a portion of the arrangement of the balls and ball spacers for the bearing assembly of FIG. 1;

FIG. 3 is an enlarged cross-sectioned view through the inner and outer races of the bearing means shown in FIG. 1, and illustrating the relationship of the balls to the ball bearing paths formed by opposed grooves in the inner and outer races of the bearing means, with a thrust load applied effecting axial shifting of the outer race relative to the inner race;

FIG. 4 is a cross sectional view showing a portion of the rotatably supported structure, such as a turntable, embodying another embodiment of bearing assembly of the invention;

FIG. 5 is a longitudinally developed view of a portion of the arrangement of the rollers and roller spacers of the bearing assembly of FIG. 4;

FIG. 6 is an enlarged cross sectional view through the inner and outer races of the bearing means as shown in FIG. 4, taken along the line 6—6 in FIG. 5 and looking in the direction of the arrows, illustrating the relationship of the rollers to the roller bearing paths formed by opposed right angle grooves in the inner and outer races of the bearing assembly, with a thrust load applied effecting relative axial shifting of the outer race relative to the inner race; and FIG. 7 is a cross-sectional view similar to FIG. 6 but being taken substantially along the lines 7—7 of FIG. 5 looking in the direction indicated by the arrows, and showing the relationship of the rollers circumferentially adjacent to the rollers of FIG. 6 with respect to the bearing paths of the inner and outer races of the bearing assembly.

DETAILED DESCRIPTION OF THE PREFERRED EMBODIMENTS

Referring now to FIGS. 1 through 3 of the drawings there is shown one embodiment of the bearing assembly of my invention incorporated in a turntable construction. The construction shown comprises a known machine base member 8 to which an annular bracket 9 is firmly secured as by welding, and a rotatable turntable, indicated at 10, of any conventional construction, and includes a pinion shaft 11 rotatably mounted in a bearing diagrammatically illustrated at 12. A pinion 14 at the lower end of pinion shaft 11 engages the internal teeth of an annular ring gear 15 which in the arrangement shown is formed as part of an annular inner race 16 forming part of a first embodiment of a novel bearing assembly 17 of the invention. The ring gear 15 and inner race 16 are secured in known manner to annular bracket 9 by a series of circumferentially spaced apart bolts 18 (only one being shown in FIG. 1). The bolts 18 as is known take the reaction of the inner race in the rotation of the turntable 10. The outer race 20 of the bearing assembly of the invention is secured in known manner to an annular flange 22 at the lower end of the turntable 10 by a series of circumferentially spaced bolts 21 (only one being shown) having threaded engagement at their inner ends with the annular flange 22.

As is known, rotation of pinion shaft 11 effects gear engagement of pinion 14 with the internal ring gear 15 to provide rotation of the turntable.

Referring now to FIGS. 1 and 3 the novel bearing assembly 17 of the invention comprises the aforementioned inner and outer annular races 16 and 20, respectively. The inner race is provided with at least a pair of parallel and concentric circumferentially extending recessed grooves providing bearing paths as at 24 and 26. The outer race 20 is also provided with a least a pair of parallel and concentric circumferentially extending recesses defining bearing paths 28 and 30. The parallelism and concentricity tolerances of the bearing paths 24 and 26, and also of the bearing paths 28 and 30 are critical and must be about 0.001 inch per inch of ball diameter for satisfactory operation of the bearing assembly. The bearing paths 24 and 26 of the inner race and the bearing paths 28 and 30 of the outer race in normal position of the races are slightly spaced apart and in opposed facing relation to receive therebetween a plurality of balls 32 of the same diameter which are separated by conventional ball spacers 33 as shown in FIG. 2; conventionally the bearing grooves are of a depth of about 47.5 percent of the ball diameter. Typically, in a specific embodiment of the invention, it has been discovered that for satisfactory operation of the bearing assembly, the aforementioned parallel and concentric relation of the bearing paths must be within 0.001 inch. Each of the bearing paths of the inner and outer races are known construction to provide, as is known in the art, four point contact of the rolling elements with the surfaces of the bearing paths. Each bearing path, of the aforementioned pair of bearing paths in each race, have two radii whose centers are offset equal amounts on either side of the plane of the ball centers.

In FIG. 3 the bearing races are shown in position at which an axial downward thrust force is applied to the outer race of the bearing assembly with the deflection exaggerated for clarity and being in an amount as indicated at X. In the position of parts shown in FIG. 3 the outer race has moved axially downwardly relative to the inner race to the extent aforenoted. In the rotation of the turntable under the conditions noted there is provided a ball to race surface contact along the lines $b - d$ in the upper bearing paths, and a ball to race surface contact on the lines $f - h$ in the lower bearing paths. Under the conditions noted it will be observed that the balls in the upper bearing paths are out of contact with bearing surface portions as indicated at a and c, and that the balls in the lower bearing paths are out of contact with bearing surface portions e and g. Thus a portion of the applied axial force is passed through the inner surface of the upper outer bearing race to the balls at $b$. The force is transmitted through the balls to the point $d$. Similarly a portion of the applied axial force is passed in the lower outer bearing race in the same direction as in the upper bearing path, from the inner surface of the lower outer bearing race to the ball bearing as at point $f$ and then through the ball bearing to point $h$. Because of the elastic deformation of the balls and races the balls are relieved as noted at a and c and e and g permitting smooth rotation of the balls around their axes perpendicular to the lines extending between points $b$ and $d$ and points $f$ and $h$. The line $b - d$ forms a nominal 50° angle with the radial center line of the ball bearings.

Upon application of axial upward thrust force applied to the outer race a similar transmission of load occurs with the load being applied at c and transmitted through the balls to point a in the upper bearing path, and by contact of the balls of the lower bearing path at point g transmitted through the balls to point e in the bearing path. An overturning moment load is similar to aforedescribed thrust loads acting in opposite directions at diametrically opposite sides of the bearing.

Referring now to FIGS. 4 through 7 of the drawings there is shown a second embodiment of a bearing assembly of the invention again incorporated in a turntable construction as in connection with the embodiment described in connection with FIGS. 1 through 3. The construction shown comprises a known machine base member 40 to which an annular bracket 41 is firmly secured as by welding, a rotatable turntable indicated at 43 of any conventional construction and in which a pinion shaft 44 is rotatably mounted in a bearing 42. A pinion 45 at the lower end of pinion shaft 44 engages the internal teeth of an annular ring gear 46 which in the arrangement shown also forms part of an annular inner race 47 forming part of the novel bearing means 48 of the invention. The ring gear 46 and inner race 47 are secured in known manner to annular bracket 41 by a series of circumferentially spaced apart bolts 50 which also serve as reaction members for the inner race 47, only one being shown in FIG. 4. The outer race 52 of the bearing means of this embodiment of the invention is secured in known manner to an annular flange 54 at the lower end of turntable 43 by a series of circumferentially spaced bolts 55 having threaded engagement at their inner ends with the annular flange 54.

As is known, rotation of pinion shaft 44 effects gear engagement of pinion 45 with the internal ring gear 46 to provide rotation of the turntable 43.

Referring now to FIGS. 4, 6 and 7 the bearing assembly of the embodiment of the invention comprises the aforementioned inner and outer annular races 47 and 52, respectively. The inner race 47 is provided with at least a pair of parallel and concentric circumferentially extending right angular bearing paths, as at 49 and 51. The outer race 52 is also provided with at least a pair of parallel and concentric circumferentially extending right angle bearing paths 53 and 54. The bearing paths of the inner and outer races as before each have a critical tolerance of about 0.001 inch per inch of roller diameter. The grooves 49 and 51 of the inner race and the grooves 53 and 54 of the outer race are in the normal position of the races slightly radially spaced apart in opposed facing relation and receive therebetween a plurality of rollers 56 of the same diameter which are separated by conventional roller spacers 57 as shown in FIG. 5.

Typically, in a specific application, it has been discovered that for satisfactory operation of the bearing assembly the aforementioned parallel and concentric relation of the bearing paths in each race must be of a tolerance of about 0.001 inch. Each of the bearing paths of the inner and outer races are of known configuration to provide as is known in the art for four point contact of the rolling elements with the surfaces of the bearing paths.

The roller elements 56 are all of the same axial lengths but less than the diameters thereof and are disposed in each of the bearing paths with the axes of circumferentially adjacent rollers, as best seen from FIG. 5, being preferably disposed at right angles with respect to each other whereby the peripheries of circumferentially successive rollers may contact different sets of bearing paths.

In FIG. 6 the bearing races are shown in position at which an axial downward thrust force is applied to the outer race of bearing assembly with the extent of deflection of the outer race with respect to the inner race being exaggerated for clarity and indicated by the letter X. In the position of the parts the outer race is moved axially downwardly relative to the inner race. In rotation of the turntable under the condition noted the outer peripheries of circumferentially alternate set of rollers as described in the upper bearing path transmit respective bearing loads through the rollers along contact lines $h$ and $k$ of the upper bearing path and along contact lines $o$ and $m$ of the lower bearing path. As shown in FIG. 6, under the conditions stated the rollers 56 in the upper bearing path are relieved of contact at $j$ and the rollers 56 in the lower bearing path are relieved at $l$, while in FIG. 7, the rollers in the upper bearing path are relieved at $h$ and at $j$ and in the lower bearing path are relieved at $o$ and at $l$.

In FIG. 7, upon application of axial upward thrust force applied to the outer race a similar transmission of load occurs with the load being applied at $i$ and transmitted through the rollers to point $j$ in the upper path and from point $n$ through the rollers to point $l$ in the lower path, while at points $h$ and $o$ and in FIG. 6 the rollers are relieved of contact. Thus circumferentially alternate rollers carry the load on the bearing paths at right angles to each other to in effect provide a four-point bearing contact of the rollers with the bearing races.

While there has been shown and described certain preferred embodiments of the invention, it will be understood that modifications and rearrangements may be made therein without departing from the spirit and scope of the invention.

The invention claimed is:

1. In a bearing assembly the combination of annular inner and outer bearing races, said inner and outer bearing races having at least two parallel and concentric grooved bearing paths, bearing means having rolling elements of the same diameter in said bearing paths providing for four points of contact with the surfaces of said bearing paths, and said grooved bearing paths of each race being parallel and concentric within a tolerance of about 0.001 inch per inch of diameter of said rolling elements.

2. The bearing assembly of claim 1 in which said bearing assembly comprises a plurality of balls disposed in said grooved bearing paths and in which said grooved bearing paths in each race have two radii whose centers are offset equal amounts on either side from the plane of the ball bearing centers.

3. The bearing assembly of claim 1 in which the grooved bearing paths are of right angular configuration with the open ends of the grooved bearing paths in the inner and outer races being in opposed relation, and each providing two opposed bearing surfaces in which said bearing assembly comprises a plurality of rollers of the same axial lengths and less than the diameters thereof and disposed in each of said grooved paths to provide for engagement of the peripheries of said rollers with opposed bearing surfaces of each of said grooved bearing paths, and in which the axes of circumferentially adjacent rollers are at right angles with respect to each other whereby end surfaces of said circumferentially adjacent rollers are out of contact with circumferentially successive alternate opposed surfaces of said grooved bearing paths.

* * * * *